US006003217A

United States Patent [19]

Graves et al.

[11] Patent Number: 6,003,217

[45] Date of Patent: Dec. 21, 1999

[54] SIZE-IN-STORE PLEATED SHADE AND METHOD AND APPARATUS OF SIZING

[75] Inventors: Delbert B. Graves, Warren; Jeffrey L. Sands, Freeport, both of Ill.; Si-Chaun Cheou, Taipei, Taiwan

[73] Assignee: Newell Operating Company, Freeport, Ill.

[21] Appl. No.: 08/550,436

[22] Filed: Oct. 30, 1995

Related U.S. Application Data

[63] Continuation of application No. 07/790,290, Nov. 8, 1991, abandoned, which is a continuation-in-part of application No. 07/726,879, Jul. 8, 1991, Pat. No. 5,604,647.

[51] Int. Cl.[6] ..................... B23P 19/04

[52] U.S. Cl. ..................... 29/24.5; 29/412; 83/13; 83/929

[58] Field of Search ..................... 83/564, 13, 929; 29/24.5, 560, 412, 401.1

[56] References Cited

U.S. PATENT DOCUMENTS

| | | | |
|---|---|---|---|
| 2,418,515 | 4/1947 | Lewis | 29/24.5 |
| 4,819,530 | 4/1989 | Huang | 29/24.5 |
| 4,901,419 | 2/1990 | Voss | 29/412 |
| 4,928,369 | 5/1990 | Schnebly et al. | 29/24.5 |
| 4,993,131 | 2/1991 | Graves et al. | 29/24.5 |
| 5,072,494 | 12/1991 | Graves et al. | 29/24.5 |

*Primary Examiner*—M. Rachuba
*Assistant Examiner*—Sean A. Pryor
*Attorney, Agent, or Firm*—Foley & Lardner

[57] ABSTRACT

The invention pertains to a method of and apparatus for sizing a factory made pleated shade downwardly to an exact width from a factory made width at the point of purchase in a retail outlet using the skill level of the service personnel commonly found in such retail establishments. Specifically, a pleated shade having (a) two or more lift cords and (b) head and bottom rails which are slidable with respect to the top pleat or pleats and the bottom pleat or pleats, respectively, is arranged so that the pleats as an integral unit can be moved relative to both the head and bottom rails in diametrically opposite directions whereby the pleats may be sized by cutting off portions at each and thereof and the rails sized by single or multiple cutting operations.

14 Claims, 16 Drawing Sheets

SIZE-IN-STORE PLEATED SHADE AND METHOD AND APPARATUS OF SIZING

This application is a continuation of application Ser. No. 07/790,290 filed Nov. 8, 1991, the benefit of the filing date of which is hereby claimed now abandoned, which is a continuation-in-part of Ser. No. 07/726,879, filed on Jul. 8, 1991 now U.S. Pat. No. 5,604,647.

This invention relates generally to window coverings and specifically to pleated shades.

BACKGROUND OF THE INVENTION

Many types of window coverings are currently available including window shades, venetian blinds, louver blinds, mini-blinds and pleated shades. Until recent years all of these coverings were sold in either stock widths in retail outlets, such as mass merchandisers, in which event the coat per covering was quite low, or were sold as a customized product, usually at specialty stores, in which event the cost was quite high on a per unit basis.

The disadvantage of being limited to a choice of only a few stock widths is that many windows, particularly windows in older homes, are of non-standard widths. Hence, if a stock width covering was too wide for the window, it had to be mounted on the outside of the window frame which generally is aesthetically unpleasing and may present decorating difficulties if drapes were also desired in addition to the standard window covering. If the stock width covering was not quite wide enough to cover the complete window width, light could enter along the edges and privacy was not complete.

The above described disadvantages of the stock width coverings were overcome by customized coverings, such as those which are provided by specialty stores, but customized coverings are so expensive that they were, and are, unavailable to the great mass of potential purchasers due to their high per unit cost.

The disadvantage of some of the stock width coverings have been overcome to a considerable extent by the development in recent years of size-at-home or size-in-store window coverings. For example, a window shade has been developed which the purchaser can buy in a mass merchandising retail outlet on an impulse; i.e., not a planned purchase, take home and size to the exact width required at the point of, and the moment of, installation. More recently a system for sizing mini-blinds in a retail outlet such as a mass merchandiser using the level of skill typically found in such establishments has been developed.

However, no size-in-store system has been known for sizing pleated blinds to an exact required width at the point of purchase in retail outlets, including mass merchandisers, utilizing the skill level of the service personnel which are typically found in such retail establishments. One physical limitation which is generally characteristic of pleated blinds as contrasted to, for example, mini-blinds, is that the pleated blinds available at the present time require that the lift cords by which the bottom rail, and the pleats thereabove, are moved toward and away from the head rail must be fixed in location at the factory, thus necessitating that shortening be done at each end of the pleats to preserve the aesthetically balanced appearance of the covering. However, the head rail can only be shortened at one end due to the arrangement of the cord raising, lowering, and locking mechanism which is hidden from view at one end of the head rail and accessed only through the side of the head rail at one end thereof, thus precluding the possibility of concurrent sizing of pleats and rails. This limitation should be contrasted to the recent system for sizing mini-blinds referred to earlier in which the sizing is simply and easily accomplished by moving one or more ladder and lift cords toward the cord lock end of the structure and sizing all elements in one operation, followed by replacement of the earlier displaced ladder and lift elements to their sized, final positions. This procedure is not feasible for pleated shades in which the lift cords are fixed in position at the factory.

SUMMARY OF THE INVENTION

The invention pertains to a pleated shade which is capable of use in its factory made condition or, if desired, of being sized downwardly to an exact width from a factory made width at the point of purchase in a retail outlet using the skill level of the service personnel commonly found in such retail establishments. The invention further pertains to a method of and apparatus for sizing a factory made pleated shade downwardly to an exact width from a factory made width at the point of purchase in a retail outlet using the skill level of the service personnel commonly found in such retail establishments. Specifically, a pleated shade having (a) two or more lift cords and (b) head and bottom rails which are slidable with respect to the top pleat or pleats and the bottom pleat or pleats, respectively, is arranged so that the pleats as an integral unit can be moved relative to both the head and bottom rails in diametrically opposite directions whereby the pleats may be sized by cutting off portions at each end thereof and the rails sized by single or multiple cutting operations.

BRIEF DESCRIPTION OF THE DRAWING

The invention is illustrated more or less diagrammatically in the accompanying drawing wherein.

DESCRIPTION OF SPECIFIC EMBODIMENT

Figure 1:
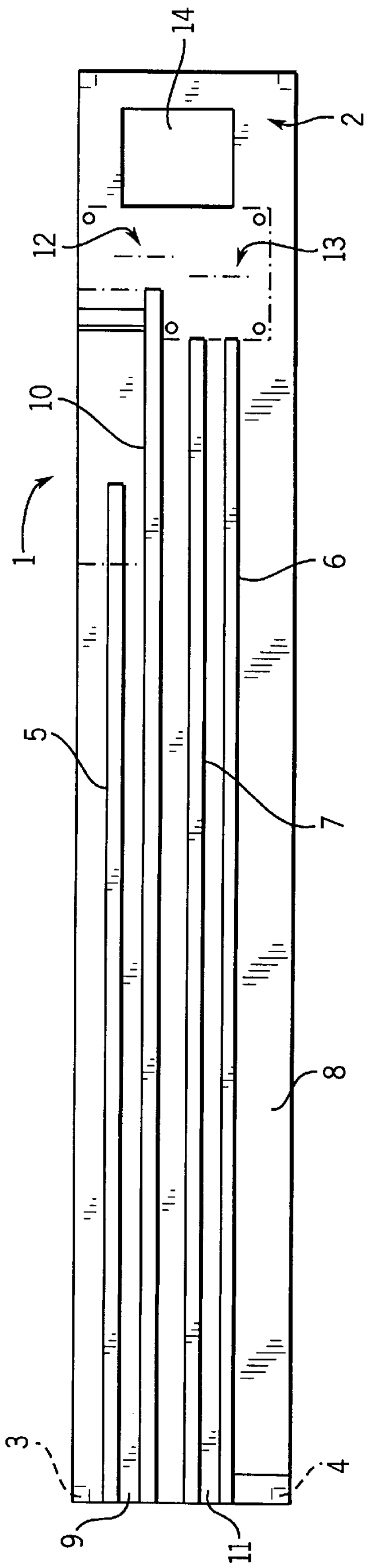
FIG. 1 is a top plan view of an apparatus for sizing a standard width factory made pleated shade of this invention to a shorter width.

Like reference numerals will be used to refer to like parts from Figure to Figure in the following description of the drawing of the invention.

Figure 3:
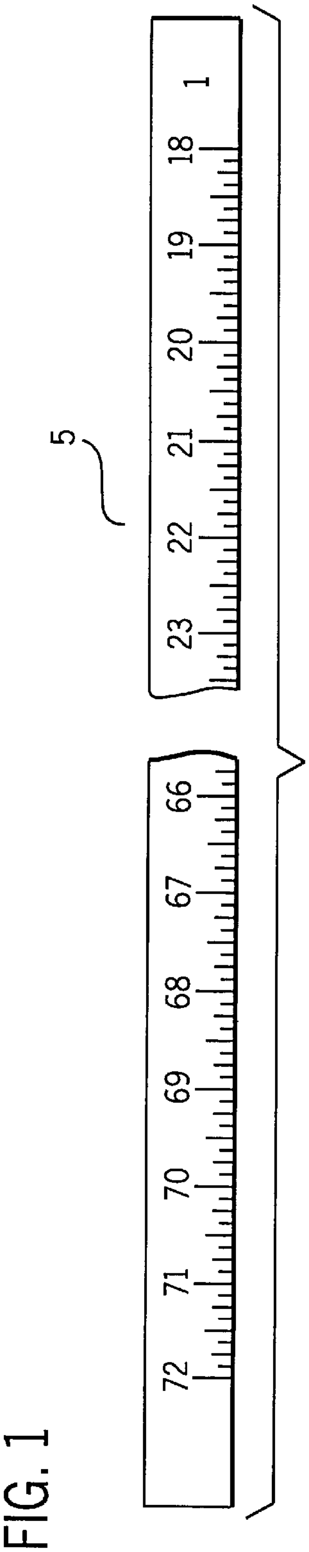
FIG. 3 is a top plan view of a first full scale measuring tape included in the apparatus of FIG. 1 with part broken away.
Figure 4:
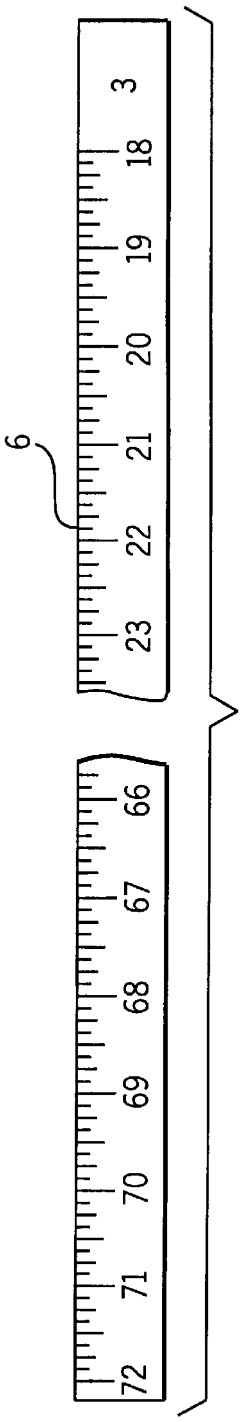
FIG. 4 is a top plan view of a second full scale measuring tape included in the apparatus of FIG. 1 with part broken away.
Figure 2:
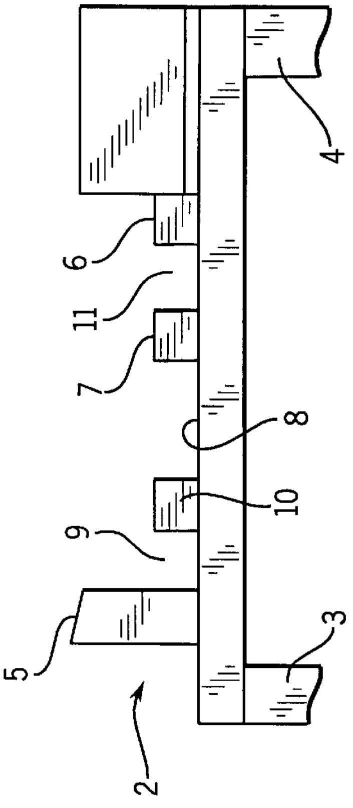
FIG. 2 is a left end view of the cutter table of FIG. 1 with parts broken away.
Figure 5:
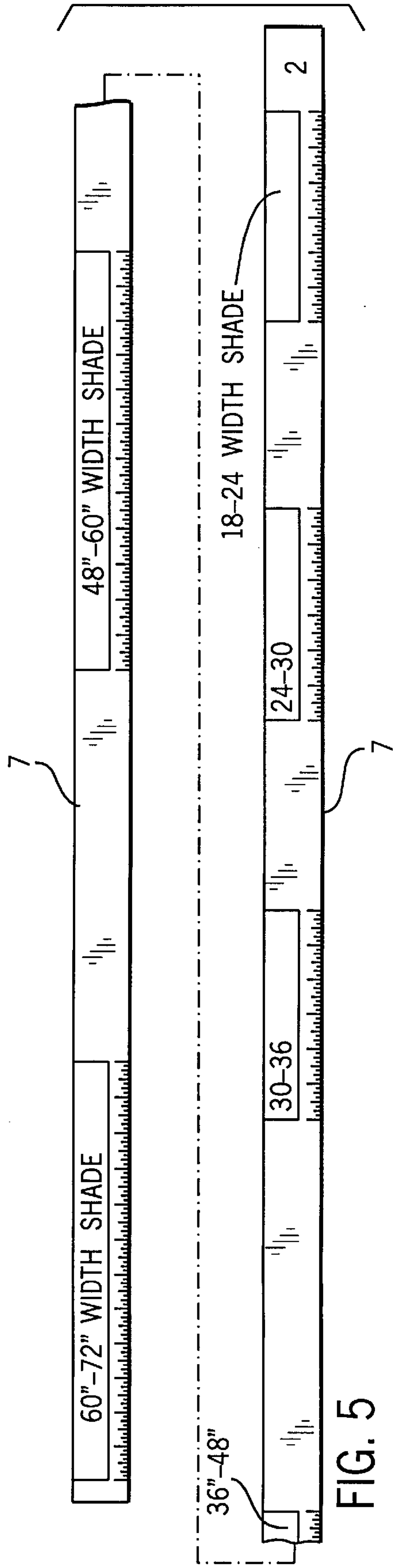
FIG. 5 is a top plan view of a one-half scale measuring tape included in the apparatus of FIG. 1.

Apparatus for sizing, that is shortening, a factory made pleated shade at the point of purchase in a retail outlet utilizing the level of skill found in such establishments is indicated generally at 1 in FIG. 1. The apparatus includes a flat cutter table, indicated generally at 2, which, as best seen from FIG. 2, is supported by legs 3, 4, at a convenient height for an operator. The table includes a first full scale measuring tape 5, which is illustrated best in FIG. 3, a second full scale measuring tape 6 which is illustrated best in FIG. 4, and a one-half scale measuring tape 7 which is illustrated best in FIG. 5. Each of the measuring tapes may be simply markings on the upper flat surface 8 of the cutter table. Preferably they are raised as illustrated in FIG. 2 so that a first guide track 9 is formed between tape 7 and an associated raised member 10, and a second guide track 11 is formed between tapes 7 and 6, all for a purpose which will appear hereinafter. If desired, the first tape 5 may be placed on an inclined surface, as illustrated for example in FIG. 2.

Figure 8:
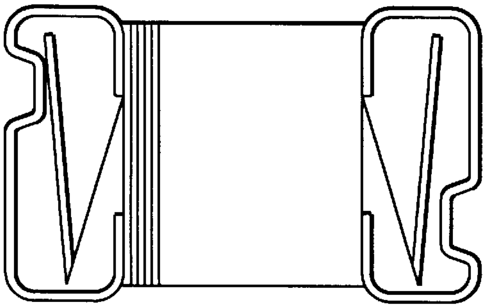
FIG. 8 is an end view of the pleated shade of this invention in a compressed condition.

A rail cutter assembly is indicated generally at 12 and a fabric cutter assembly is indicated generally at 13. A hole 14 in the right end portion of the table top is provided to receive cut ends of the rails and pleated shade, the hole discharging into a waste receptacle. The rail and fabric cutter assemblies 12 and 13 will be described primarily in connection with FIGS. 7 and 8.

A tooling base plate 15 is secured to table top 8 by bolts 16, 17, 18 and 19. The tooling base plate supports both the rail cutter assembly and the fabric cutter assembly and each may be removed from plate 15 for inspection and repair/replacement without disturbing the other.

Rail cutter assembly includes a generally rectangular head rail cutter base, indicated generally at 21 which is bolted to the base plate by bolts 22, 23 and 24. The rail cutter base includes a shallow, longitudinal central channel, indicated at 25, and a shallow, transverse channel indicated at 26. The term "longitudinal" is used to denote an orientation parallel to the measuring tapes 5, 6 and 7, and "transverse" is used to denote an orientation generally crosswise of said tapes. The right portion 27 of central channel 25 is sloped downwardly to the right as viewed in FIG. 6 to form a slideway for severed rail ends to fall by gravity into and through waste hole 14 in table 2.

Figure 6:
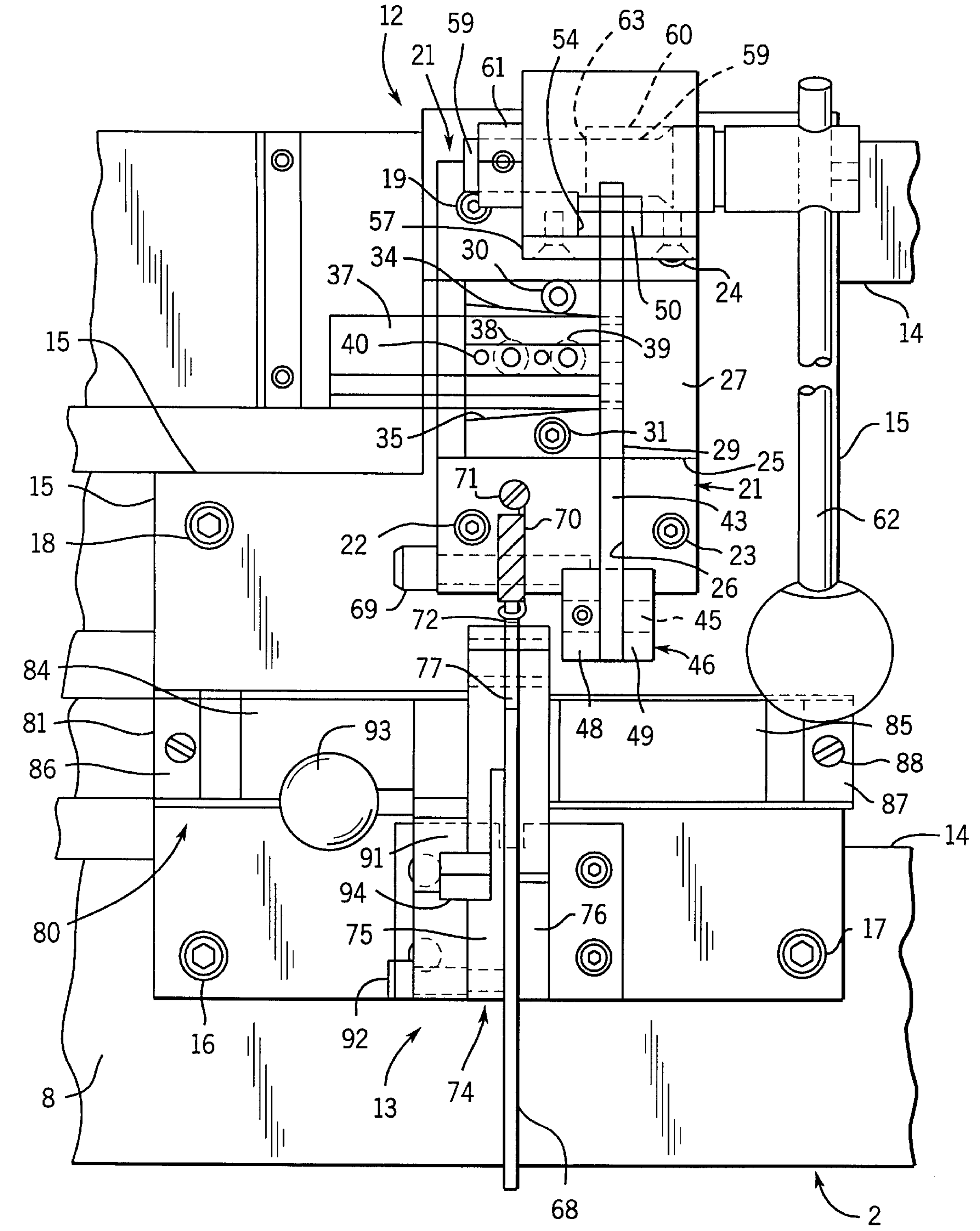
FIG. 6 is a top plan view of the rail cutting and the fabric cutting assemblies of the apparatus of FIG. 1.
Figure 7:
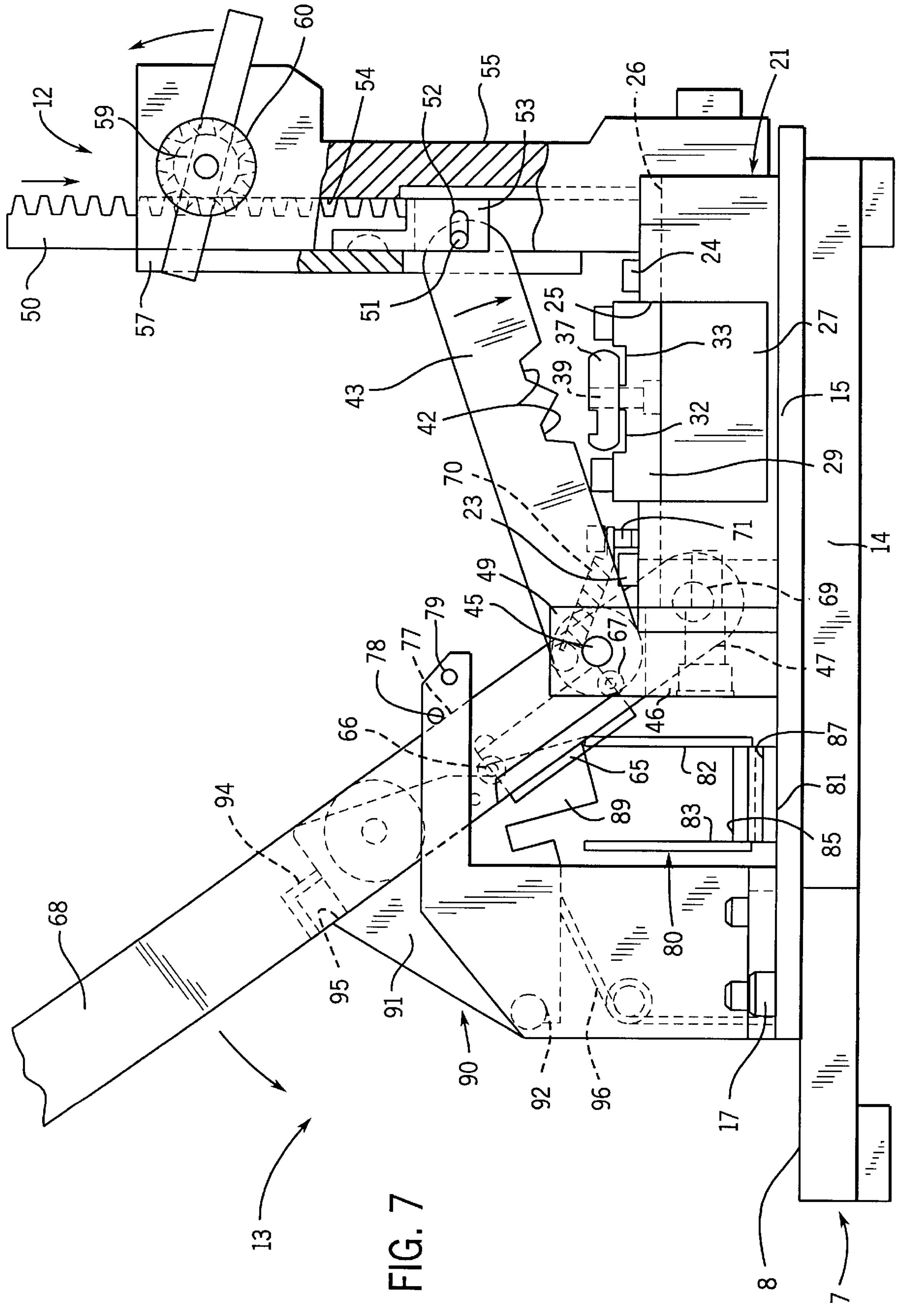
FIG. 7 is a right side view of the rail cutting and the fabric cutting assemblies of FIG. 6.

A rectangular head rail cutting block is indicated at 29, the block being secured to the head rail cutter base 21 by bolts 30, 31. As best seen in FIG. 7, a pair of depressions 32, 33 are formed in the upper flat surface of the cutting block 29, the outside edges of depressions 32, 33 flaring outwardly as at 34, 35. A head rail cutting horn is indicated at 37, the right edge of which terminates in alignment with the right edge of the cutting block 29 and the left end of which projects rearwardly beyond the left edge of rail cutter base 21. The cutting horn is secured to the cutting block 29 by two bolts 38, 39 and guide pins 40, 41, see FIG. 6. It will be noted that the cutting horn has a fixed contour so that a rail to be cut which has an interior contour which is complementary to the exterior contour of the cutting horn can only be fed over the cutting horn in one position for presentation to the cutting mechanism. It will also be noted that the clearance between the bottom of the cutting horn and the upper surface of depressions 32, 33 is of a distance just sufficient to receive the lower in-turned flanges of a rail, to be later described in detail, in a snug sliding fit without binding.

The means for cutting a rail inserted over the cutter horn 37 includes an elongated generally flat cutting blade 43 which is pivoted at 44 about a pin 45 mounted in a head rail cutter blade pivot 46 which is bolted as at 47, see FIG. 7, to the head rail cutter base 21. The upper end of the blade pivot 46 is formed with two ears 48, 49 to accommodate movement of the left end of cutting blade 43. The underside of cutting blade 43 is notched as at 42 and the blade is formed of a hardened material so as to readily severe the relatively soft rail material.

The cutting blade 43 is actuated by a rack and pinion assembly which includes a rack gear 50 which is connected to cutting handle 43 by pin 51 which slides, as required, in pin slot 52 in the lower, tooth free pivot block 53 at the bottom of the rack gear 50. The rack gear and its connected pivot blocks slide in a channel 54 formed in rack gear housing 55. The housing 55 is secured to head rail cutter base 21 by bolt 56. The front side of the channel in which the rack gear slides is formed by a cover 57. The rack gear 50 is moved up and down by a rack gear pinion 59 which is received in a hole 60 in rack gear housing 55. The left, smooth end of the rack gear pinion 59 carries a stop collar 61 which is fast with the pinion 59 by a set screw. The right, smooth end of pinion 59 is apertured to receive a head rail cutter handle 62 which is fast with the pinion 59 by a set screw. It will be understood that leftward movement of the rack gear pinion, as viewed in FIG. 6, is precluded by the shoulder 63 on the rack gear pinion.

The pleated shade cutting assembly includes a cutter blade 65, see FIG. 7, which is secured by bolts 66, 67 to a fabric cutter handle 68. Handle 68 is pivoted about a pin 69 which is received in an aperture in the front portion of head rail cutter base 21. A spring 70 which is secured at its right end, as viewed in FIG. 7, to a bolt 71 and, at its left end, to the handle through a hole 72, biases the handle in a clockwise direction as viewed in FIG. 7.

The cutter 65 and its carrying handle 68 swing, without wobble, in a confined arc formed by a fabric cutter housing indicated generally at 74. The housing 74 includes a left half 75 and a right half 76 which are bolted from their bottom surfaces to the tooling base plate 15. A spacer 77 maintains the right co-extensive ends of left and right halves 74, 75 a fixed distance apart, the spacer being connected to the fabric housing by screws 78, 79. The cutter handle 68 is shown in FIG. 7 in its maximum upward position, the upper edge of the handle making contact with spacer 77.

Pleated shade material to be shortened is fed into position under the cutting arc of cutter 65 and confined preparatory to being cut by a fabric guide indicated generally at 80. The fabric guide includes a bottom 81 and inside and outside vertical pleat confining walls 82, 83. The side confining walls are slotted, not indicated except by the juxta position of the cutter 65 and inside wall 82 in FIG. 7, to permit the cutter 65 and cutter handle 68 to move in the direction of the arrow in FIG. 7 to a substantially horizontal cut through position. In order to permit the cutter 65 to pass cleanly all the way through compressed shade material in the fabric guide without striking, and possibly chipping or dulling the cutter 65, the bottom 81 has a pair of slightly elevated portions 84, 85, see FIG. 6, which flank depressed end portions 86, 87, and a similarly depressed center portion not shown, which is aligned with the vertical arc of movement of cutter handle 68. The fabric guide is secured to the tooling base plate 15 by any suitable means 88.

Means for holding the fabric in place during the cutting action, for holding the cutter handle 68 in a position for easy accessibility by the operator, and at the same time, means for ensuring that the operator's hands are both placed at a safe distance from the sharp cutter 65 are indicated generally at 90. Said means includes a cutter hold down clamp 91 which pivots about pivot pin 92 which is received in an aperture in the left side 75 of the fabric cutter housing. The clamp 91 includes a shoe 92, see FIG. 7, which presses against the top of a compressed pleated shade when the clamp 91 is swung clockwise around pin 92. A knob 93 secured to hold down clamp 91 is placed to be readily grasped by one hand of an operator while the other hand grips the cutter handle 68.

It will be noted that cutter handle 68 carries a catch 94 on its left side, see FIG. 6, which is located so as to be received in a notch 95 when spring 70 pulls cutter handle 68 clockwise, and operator pressure on knob 93 is released allowing spring 96 to urge the hold down clamp 91 counterclockwise around pivot 92.

A step-by-step procedure for sizing a pleated shade using the above described apparatus is illustrated in FIGS. 9–12 to which reference is now made.

Figure 9:
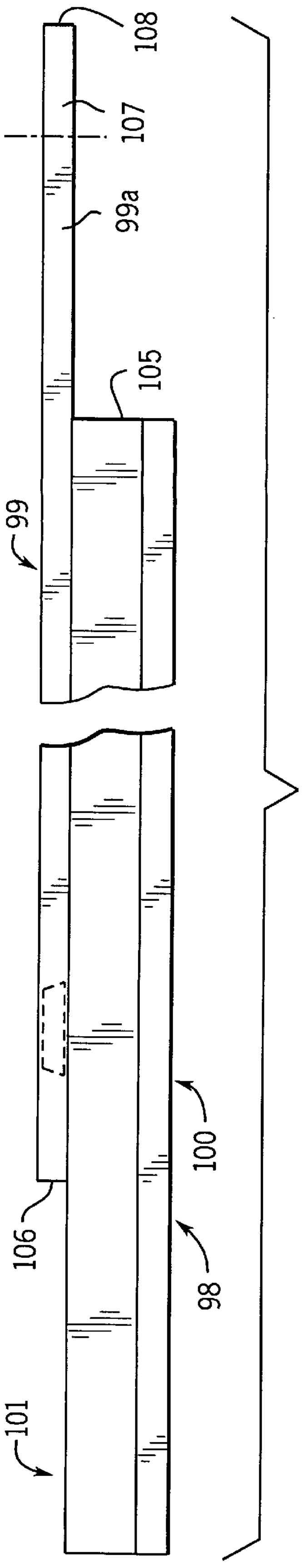
FIG. 9 is a side elevation of a compressed pleated shade of this invention in its factory made condition preparatory to being downsized to a shorter width with one rail extended beyond the pleated fabric just prior to cutting.
Figure 10:
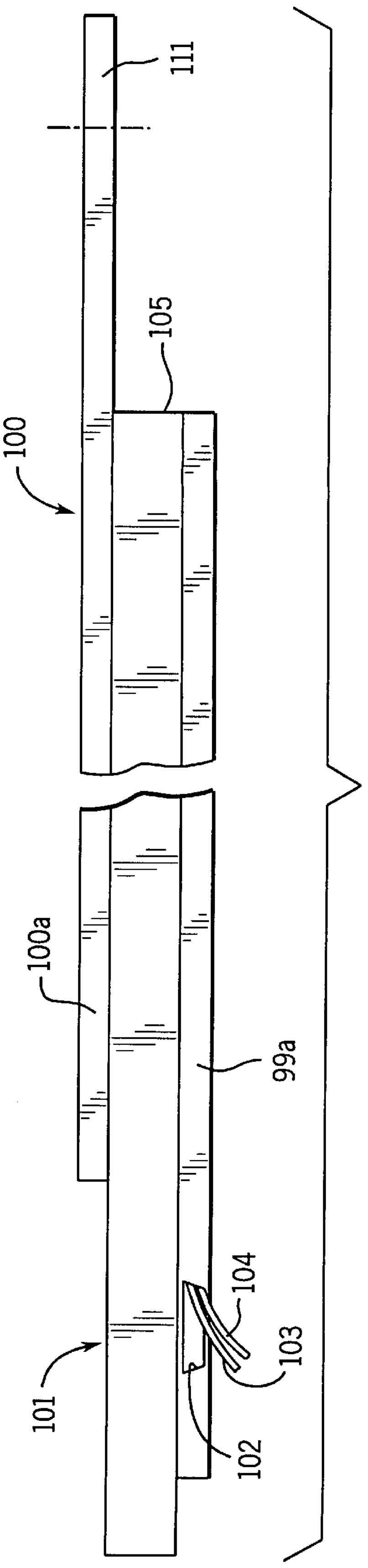
FIG. 10 is a similar side elevation with the other rail extended beyond the pleated fabric just prior to cutting.

In FIG. 9 a pleated shade in its as-made condition and as received at a retail establishment is indicated generally at 98. This shade includes a top rail 99, a bottom rail 100 and a compressed, or more accurately, a retracted, pleated shade 101 made from fabric or a fabric-like material. The rails are preferably formed from sheet metal of a conventional thickness. The fabric may, for example, be polyester or a polyester-type fabric with suitable denier, weft, warp, and UV rating, and it may be coated. A cord lock opening is indicated at 102 through which two extending and retracting pull cords 103, 104 extend. It will be understood that following sizing, a cord lock mechanism will be inserted in cord lock opening 102.

To size, that is, to shorten a factory made pleated shade by an operator in a typical retail establishment, such as a semi-self service chain store, in accordance with the invention the following steps are performed.

The top and bottom rails 99, 100 each receive at least one pleat in the pleated shade and hence are connected to the pleated material thereby. The top rail and the bottom rail are, however, slidable with respect to the compressed pleats so that they can be extended beyond the ends of the pleats to be thereby presented for sizing to suitable sizing apparatus.

In FIG. 9 the factory made shade has been placed in guide track 9 of FIGS. 1 and 2 which receives and holds it in a compressed condition because of the raised members 5 and 10, see FIG. 2. The operator, in the FIG. 9 position, has determined that a factory made shade of 24" should be shortened to 22". As a consequence, the top rail at the end opposite the cord lock opening 102 has been slid outwardly beyond the first end 105 of the pleated shade. It will be understood that as the right end 108 of the top rail is slid to a desired location it will slide over the head rail cutting horn 37 with the lower, inward flanges, 109, 110, see FIG. 5, being received in depressions 32, 33 in the rail cutting block 29. It will be noted that the cross section contour of the rail cutter horn matches the internal contour of the rail. The rails are guided into cutting position by the flared walls 34, 35 in depressions 30, 31 respectively.

The operator then aligns the left end 106 of the top rail with the 2" mark on the full scale measuring tape 5. When the left end 106 is aligned with the 22" mark on tape 5, two inches of the right portion of the rail to be severed, indicated at 107, will extend beyond the right edge of the rail cutting block 29 and, also, lie in alignment with the left edge of the rail cutting blade 43 which carries the piercing tooth 36 formed by the notches 42. Counter clockwise rotation at rail cutter handle 62 will drive rack gear 50 downward due to rotation of rack gear pinion 59 which in turn will force rail cutting blade 43 into cutting or severing engagement with the portion 107 of the rail which projects beyond the right edge of rail cutting block 29. The severed portion 107 will fall down the downwardly slanted ramp 27 of the rail cutter base 21 and into and through hole 14 in the table to a waste receptacle, not shown.

After return clockwise rotation of handle 62, the sized head rail 99*a* is removed from guide track 9 and slid toward the pleated fabric preparatory to the next stop.

Figure 14:
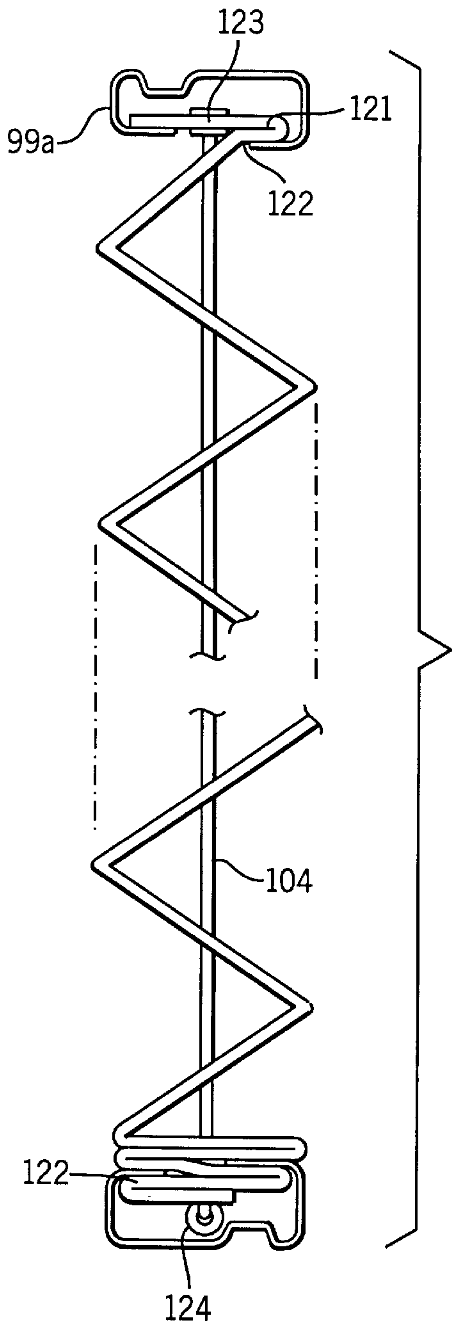
FIG. 14 is an end view of the pleated shade of this invention in an extended position.
Figure 15:
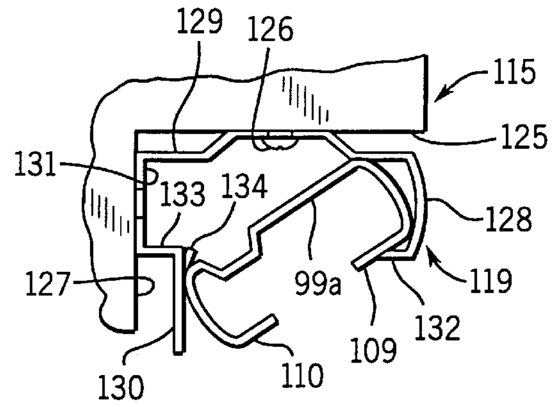
FIG. 15 is an end view of means for connecting the head rail of the pleated shade of this invention to a suspending bracket.
Figure 16:
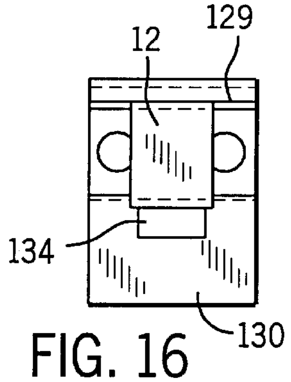
FIG. 16 is a front view of the bracket of FIG. 15.
Figure 17:
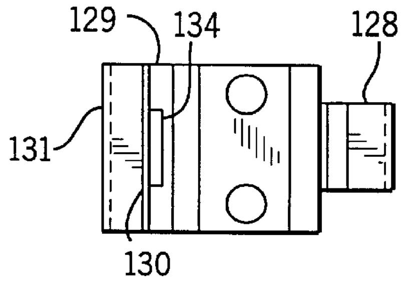
FIG. 17 is a bottom view of the bracket of FIGS. 15 and 16.
Figure 18:
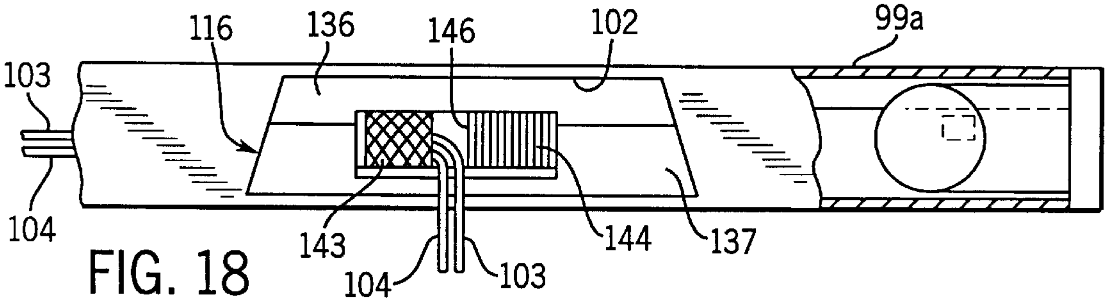
FIG. 18 is a side view of the cord lock end of the pleated shade of this invention with parts broken away for clarity.
Figure 19:
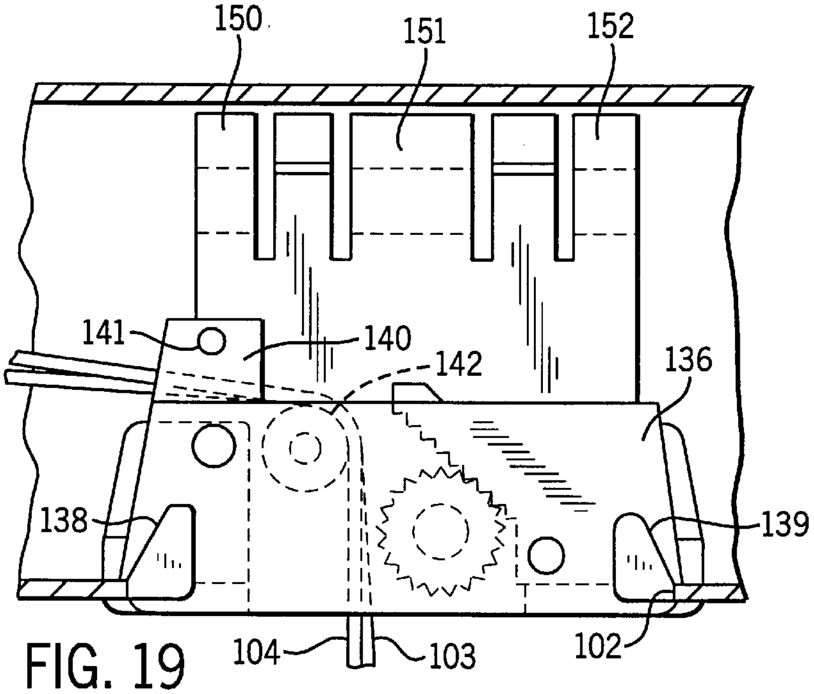
FIG. 19 is a top plan view of an installed cord lock of the pleated shade of this invention with parts shown in phantom and others in section.
Figure 20:
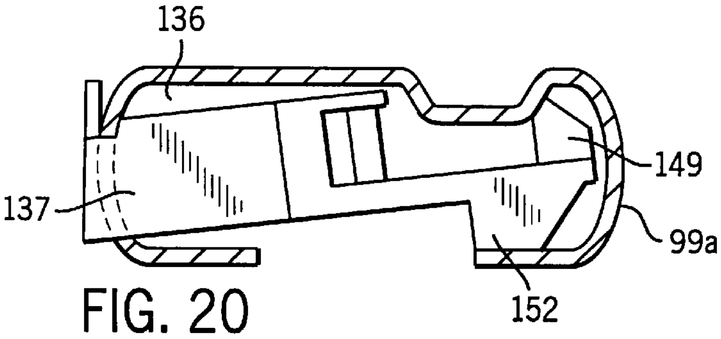
FIG. 20 is a right side view of the installed cord lock of the pleated shade of this invention with the head rail in section.
Figure 21:
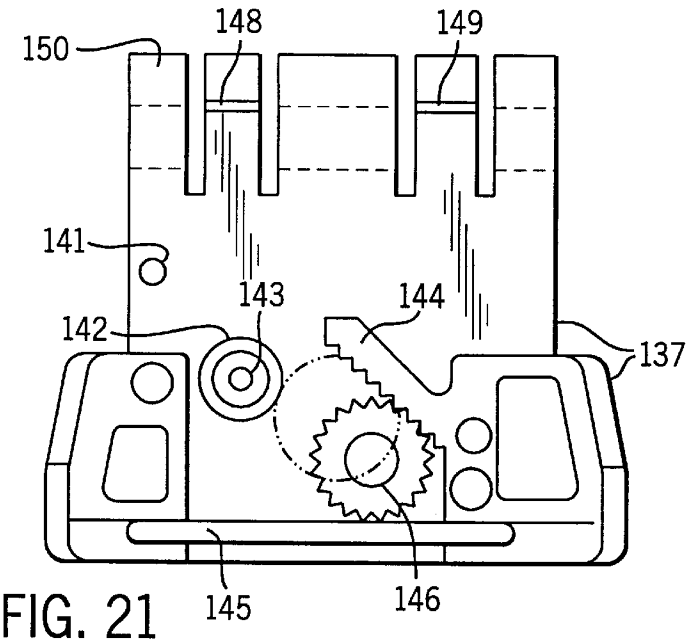
FIG. 21 is a top plan view of the cord lock housing of the cord lock of FIG. 20.
Figure 22:
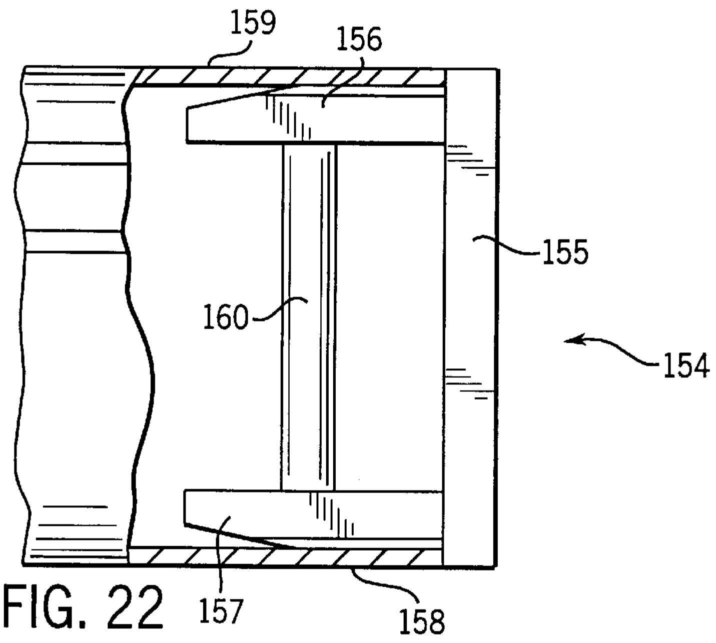
FIG. 22 is a top view of an end cap of a rail of the pleated shade of this invention with the end of the rail broken away to show an end cap.
Figure 23:
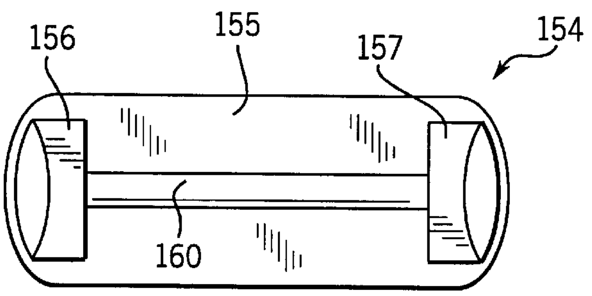
FIG. 23 is a left end view of the end cap of FIG. 22.

The shade with its sized head rail 99*a* is then rotated 180 degrees, re-placed in guide track 9, and the bottom rail 100 slid outwardly beyond the end 105 of the fabric 101 until at least the two inches to be severed, indicated at 111, extend beyond end 105. The bottom rail 100, whose contour is identical of that of top rail 99 as best seen in FIG. 14, is then slid over rail cutting horn 37 and the left end aligned with the 22 inch mark on full scale measuring tape 5. The above described cutting action is repeated and, upon completion, the head and bottom rails will be shortened to the desired size.

Figure 11:
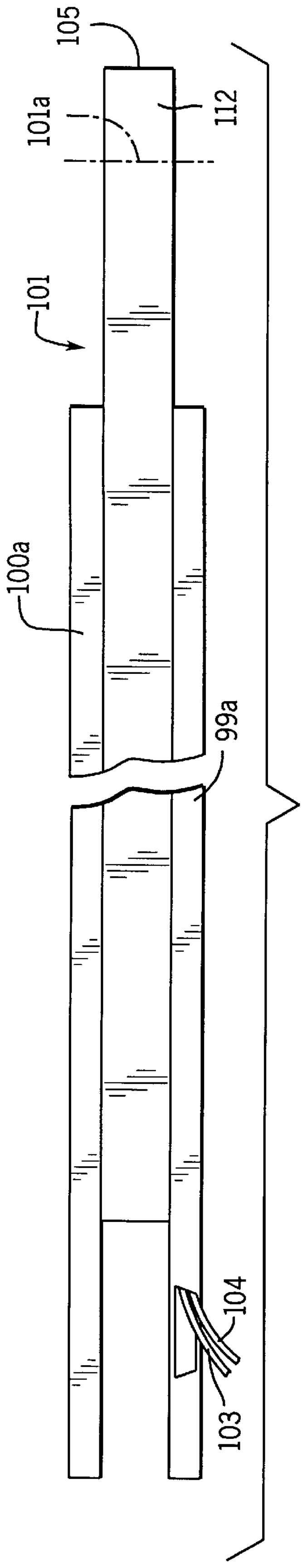
FIG. 11 is a side elevation of the rail shortened shade with one end of the pleated fabric extending beyond the adjacent rails just prior to cutting said one end of the pleated shade.
Figure 12:
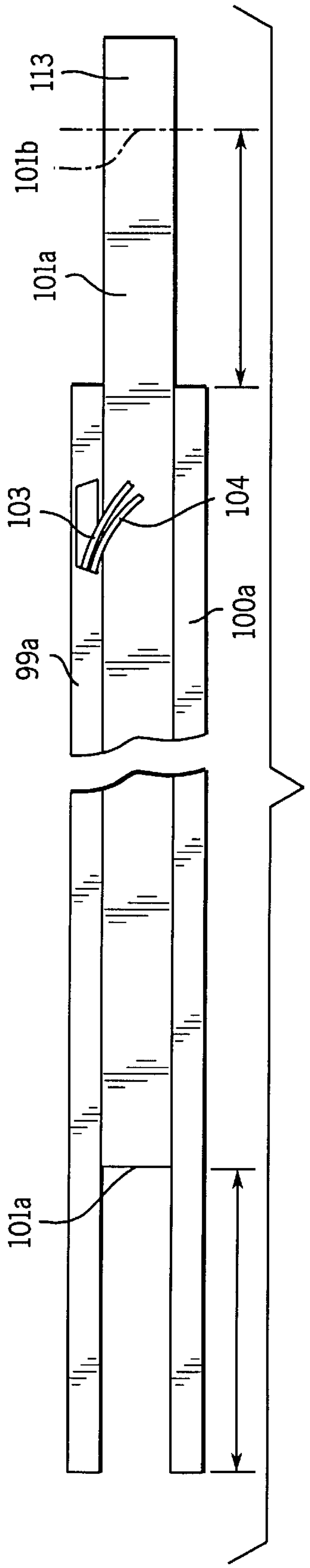
FIG. 12 is a side elevation of the rail shortened shade with the other end of the pleated fabric extending beyond the adjacent rail ends just prior to cutting said other end of the pleated shade.

Thereafter, the rail-shortened shade is removed from guide track 9 and the pleated fabric 101 slid outwardly beyond the ends of the rails to expose at least one-half of the length of the pleated fabric to be shortened, the portion to be severed being indicated at 112 in FIG. 11. The end 105 of the pleated fabric is slid into the fabric guide 80 and the left end of fabric 105 is aligned with the 22 inch mark on the one-half scale measuring tape 7.

When this alignment is made, the left and of portion 112, indicated by the broken line in FIG. 11, will be aligned with the cutter 65. Thereafter, the operator, with one hand, pushes downwardly on knob 93 to swing fabric hold down clamp 91 clockwise and cause foot 89 to press downwardly from above on the fabric to the left of cutter head 68. This movement of the hold down clamp 91 also moves catch 94 out of engagement with 95, thereby freeing up cutter handle 68 to move.

The operator then grasps cutter handle 68 with the other hand and swings the handle counter clockwise until blade 65 passes through the compressed pleats to form a new end, 101*a*, on the pleated material. The severed portion 112 falls into and through hole 14.

Thereafter the operator lists the sized rails and the partly sized fabric from the table, reverses the pleated shade end for end and places the partially sized shade in guide track 11 again. At this time the operator aligns the newly formed left end 101*a* of the fabric with a 22 inch mark on the second full scale measuring tape 6, the already shortened top and bottom rails being slid to the left. Alignment of the left end 101*a* of the pleated material in guide track 111 will cause the portion 113 of the pleated material to be severed to project under the cutter 65, with the right end 101*b* to be formed after cutting to be aligned with cutter 65.

The operator then repeats the fabric severing step described above and, at this time, all elements of the shade have been sized.

After removal from the machine, the rails and pleated shade material ends are aligned with one another and the shade is now ready for further processing.

Figure 13:
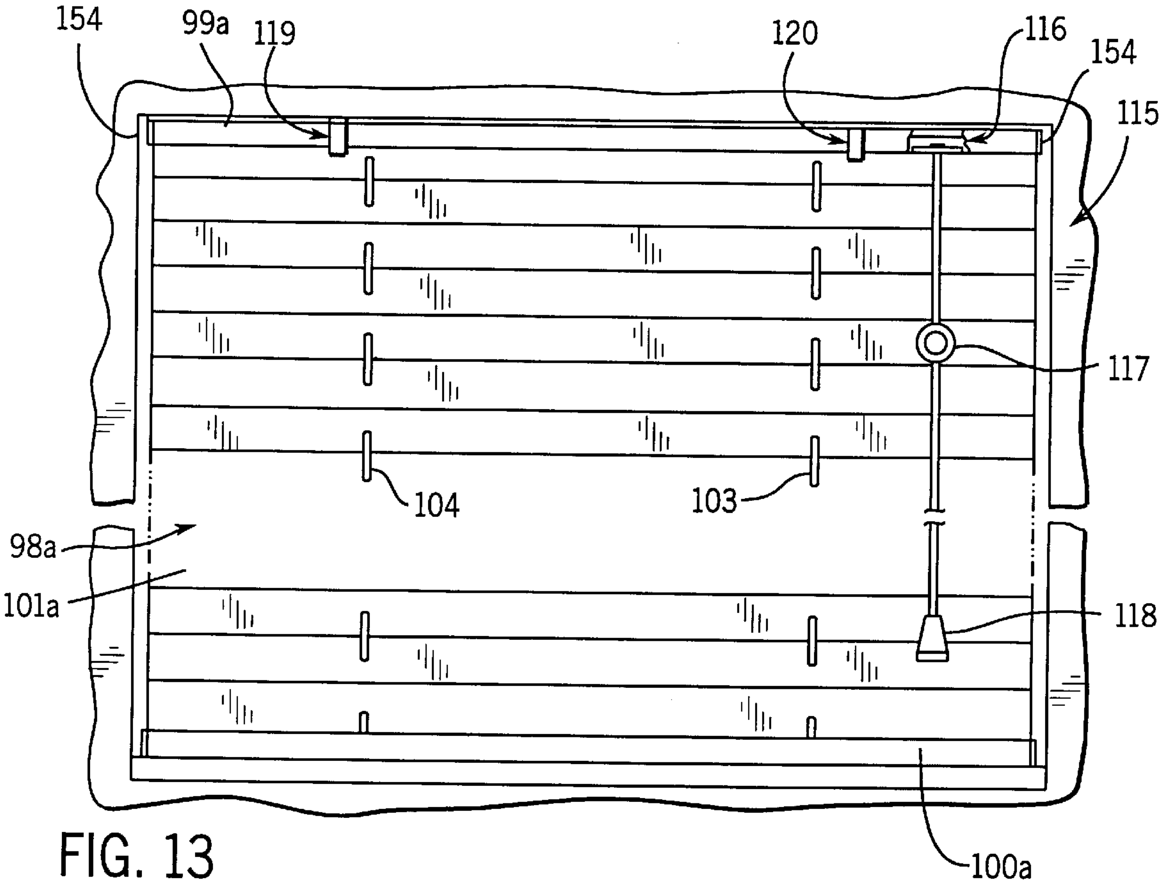
FIG. 13 is a front view of a pleated shade of this invention installed on an inside mount at a window.

An installed, sized shade is indicated generally at 98*a* in FIG. 13. In this instance it is shown as installed as an inside mounting to a window 115. The shade includes a shortened top rail 99*a*, a shortened bottom rail 100*a*, and shortened pleated material 101*a*. The bottom ends of right pull cord 103 and left pull cord 104 are concealed within bottom rail 100*a* by any suitable means. The exposed ends of the pull cords exit the cord lock 116 together, pass through a stop ball 117 and are tied off and hidden within cord pull 118. It will be noted that grasping the cord pull or the touching pulls and causing upward or downward movement will raise or lower the shade in a conventional manner. The shade is suspended from brackets 119, 120 which are secured to the inside surface of the window 115 and grasp the head rail 99*a*.

The orientation of the shade of FIG. 13 is illustrated more or less diagrammatically in FIG. 14 from which will be seen that the top pleat 121 is secured to a flexible plastic sheet 122 by eyelets 123 so that there is no possibility of the upper pleat separating from rail 99*a*. The bottom pleat 123 is similarly secured to a flexible plastic slat 122. It will be noted that the bottom end of pull cord 104 is anchored to a washer beneath the bottom slat and bottom pleat.

Bracket 119 is anchored to, in this instance, the under surface 125 of window 115 by a screw 126. The bracket could also be secured to back wall 127. Bracket 119 includes a front hook portion 128 which blends into top portion 129 which in turn blends into a rear wall 130 and a hook portion 131. The front and rear hook portions 128, 131 respectively are of a width to snugly receive head rail 99*a*. The in-turned flanged 132 supports front flange 109 of the top rail 99*a* and the outwardly projecting flange 133 supports the rear flange 110 of head rail 99*a*. The bracket has sufficient flexibility to enable the rail 99*a* to be snapped into place. A tongue 134 which is cut out of and projects forwardly from rear wall 130 restrains head rail 99*a* from falling out of the bracket 119 once it has been snapped in place.

Cord lock 116 is best illustrated in FIGS. 18–21. It includes a cover plate 136 and a cord lock housing 137 which may be separately formed and secured to one another by any suitable means, such as a snap fit. Cover plate 136 has a pair of restraining fingers 138, 139 at each side which, after the cord lock is pushed into the cord lock opening 102, spring apart and preclude the cord lock from falling out of the cord lock opening. The left rear of the cover plate has a short flange 140 which furnishes an anchor base for the upper end of a post 141 which confines the pull cords 104, 103 to a small area prior to entering the cord lock mechanism.

The cord lock housing 137 includes a card lock roller 142 which may, for example, be a knurled roller which is mounted on a post 143 extending between the cover and the housing. A toothed ramp 144 is formed in the right side of the housing and extends toward the cord lock roller so as to form a pull cord passageway between the ramp and roller. A restraining by 145 is enclosed in the sides of the housing. A stop ball 146 which has flutes on its circumference is located within the enclosure formed by the cord lock roller 142, the toothed ramp 144 and the restraining bar 145. The flutes on the stop ball match the teeth on the toothed ramp 144 so that the stop ball can run roll up and down the ramp, and be locked to the ramp when the pull cords are compressed or wedged by the force of gravity between the cord lock roller 143 and the fluted roller.

The rear of the cord lock housing terminates, in this instance, a pair of upwardly extending rear locking teeth 148, 149 and several support pads 150, 151, 152. The upper locking teeth 148, 149 engage a downwardly inclined wall formed by the notch in head rail 99*a*.

An end cap for head rail 99*a* is illustrated generally at 154, the cap including a wall 155 and a pair of prongs 156, 157. The end cap is constructed to cover the major outline of the cross section of the head rail 99*a* when installed. The prongs 156, 157 are arranged to make a press fit with the inside surfaces of the front wall 158 and the rear wall 159 of the head rail 99*a*. A reinforcing strut is indicated at 160.

Figure 24:
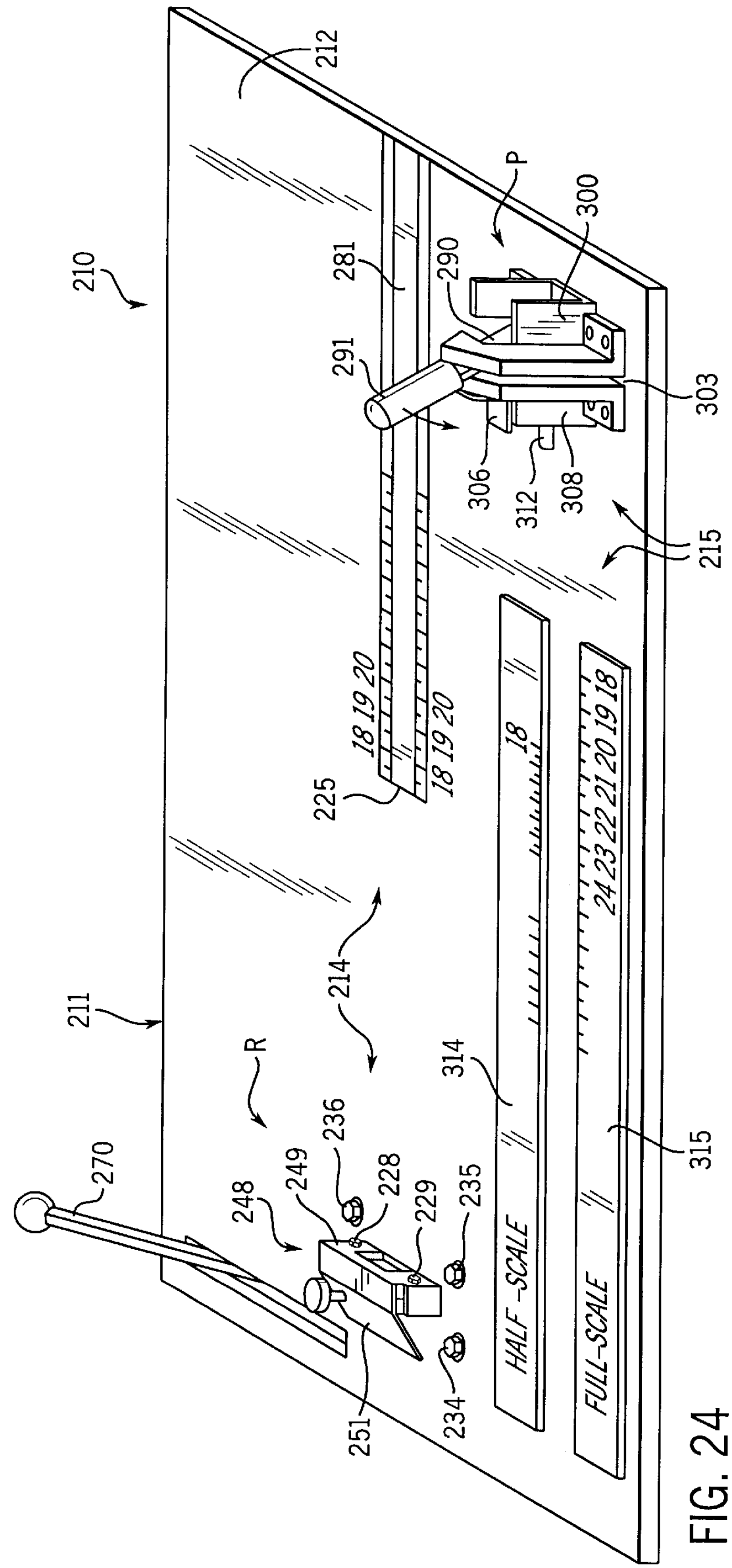
FIG. 24 is a perspective view of apparatus for sizing an alternative embodiment of a standard width factory made pleated shade of this invention to a shorter width.
Figure 25:
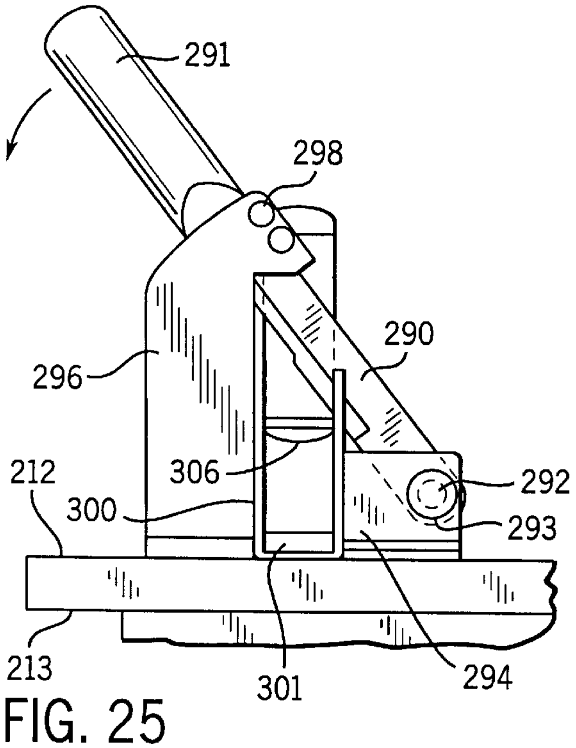
FIG. 25 is a right side elevation of the fabric cutter station shown in the lower right corner of FIG. 24.
Figure 26:
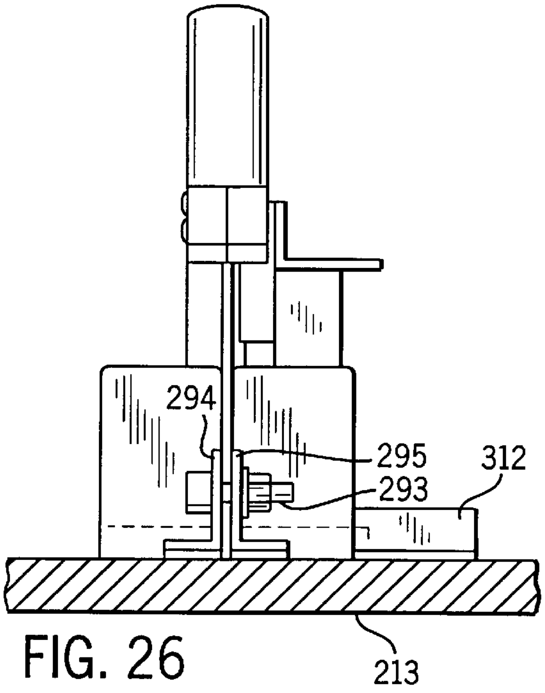
FIG. 26 is a rear elevation of the fabric cutter station.
Figure 27:
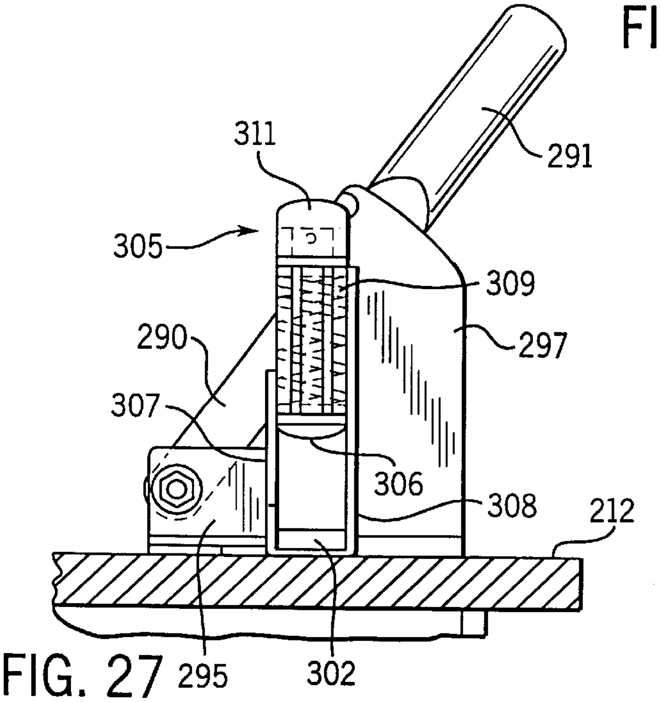
FIG. 27 is a left side elevation of the fabric cutter station.

Apparatus for sizing a factory made pleated shade at the point of purchase in a retail outlet is indicated generally at 210 in FIG. 24. The apparatus includes a flat base, here a board or table top, indicated generally at 211, the base having an upper surface 212 and a lower surface 213, see FIGS. 25–29. It will be understood that the base 211 is adapted to be supported by legs or other suitable support structure which presents top surface 212, and thereby the rail and pleat sizing mechanisms, at a convenient height for an operator. A rail sizing mechanism is indicated generally at 214 and a pleat sizing mechanism is indicated generally at 215.

Figure 31:
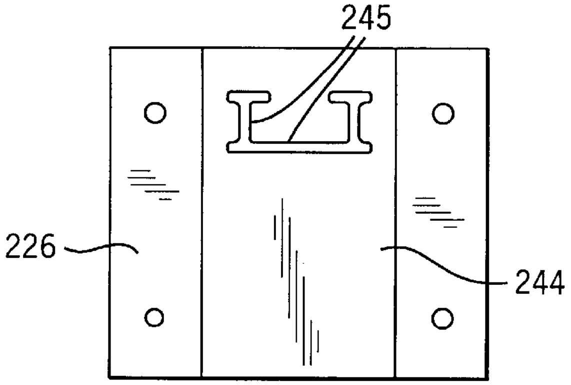
FIG. 31 is a view taken substantially along the line 20B—20B of FIG. 30.
Figure 32:
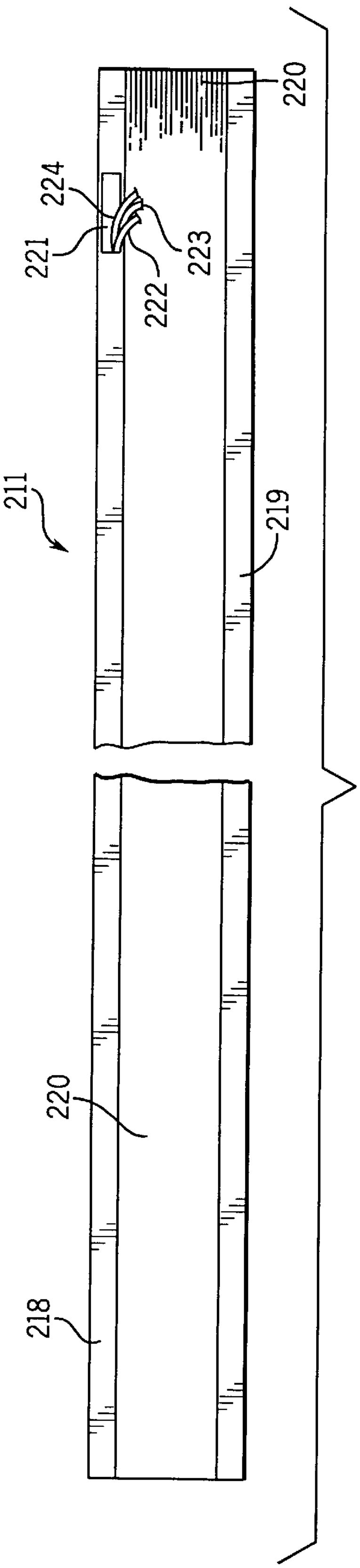
FIG. 32 is a side elevation of a compressed pleated shade in its factory made condition preparatory to being downsized to a shorter width.

A conventional factory made pleated shade is indicated generally at 217 in FIG. 32. In its as-made condition at the factory it includes a head rail 218, a bottom rail 219 and a fabric material which is formed into a series of equal width pleats indicated at 220. A cross sectional contour of, in this instance, both the head and bottom rails is indicated generally in outline in FIGS. 28, 29 and 31 wherein the position of the bottom rail is indicated as it appears in use, and the position of the head rail is indicated in an inverted position, all as will be described more fully hereinafter. The head rail includes a cord lock access opening 221 through which a plurality of ladder cords, here left cord 222, center cord 223 and right cord 224, emerge. It will be understood that the construction and relationship of the pleated fabric and the lift cords are conventional, which is a significant advantage of the invention. Thus, each of lift cords 222–224 passes through an aligned hole in each pleat of the multi-pleated fabric and its lower or distal end is anchored within the bottom rail 219. The upper, free or proximal end of each lift cord runs along the length of the interior of the head rail 218 from the point at which each cord emerges from the hole in the uppermost pleat of the pleated fabric, to the access hole 221 where the free proximal ends are presented to the user for lifting or lowering the bottom rail of the shade in a vertical or drop direction. Any suitable locking mechanism can be provided for locking the cords 222–224 in any desired intermediate position between fully extended and fully retracted, the details of which are conventional and do not in and of themselves form a part of the invention, and hence are not illustrated. Likewise, it will be understood that the top pleat or two will rest on the top surfaces of the inward turned flanges of the top flange and a strip of stiffer reinforcing material which runs along the interior of the head rail may also be used to "trap" the top pleat or pleats in the head rail and prevent unintended separation of the pleated fabric from the head rail. It will be understood that the bottom most pleat or two, or more, if desired, will likewise be received within the interior of the bottom rail and a strip of similar reinforcing material which is stiffer than the pleated material also may be inserted above one or more pleats into the side flange receptacles of the bottom rail to preclude unintended separation of the bottom of the fabric from the bottom rail.

Figure 28:
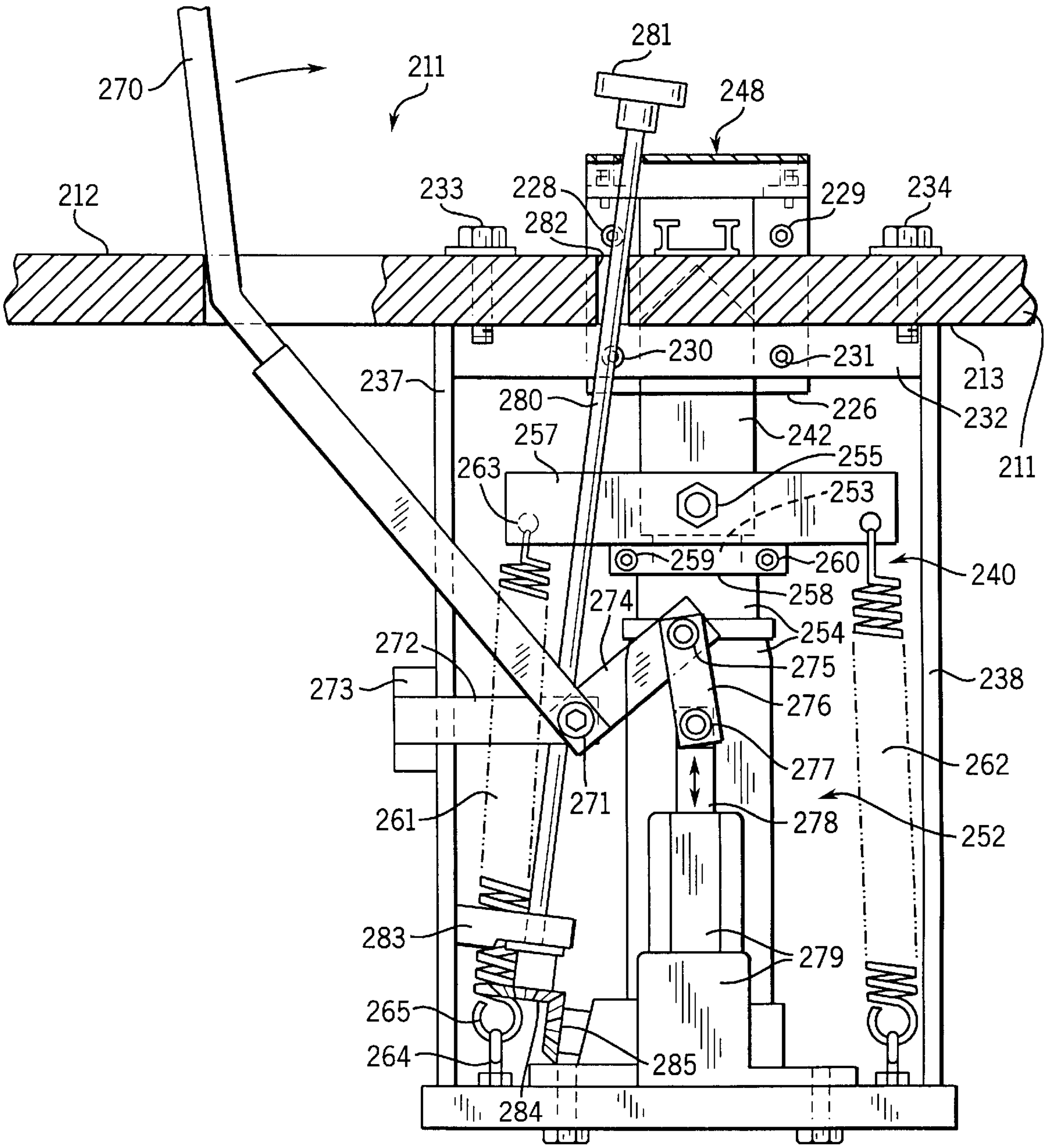
FIG. 28 is a left side view to an enlarged scale of the rail cutter station with parts in section and others in phantom.
Figure 29:
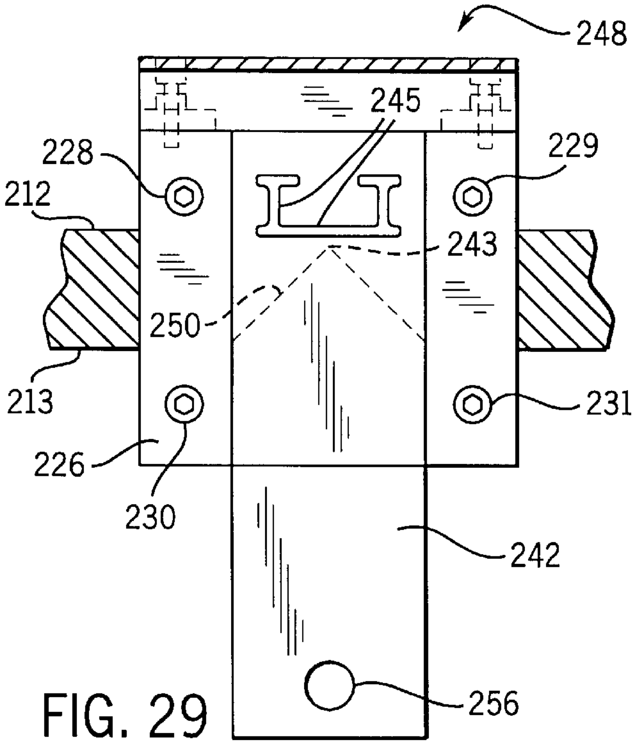
FIG. 29 is a detail view of the rail cutter blade and its guide structure.
Figure 30:
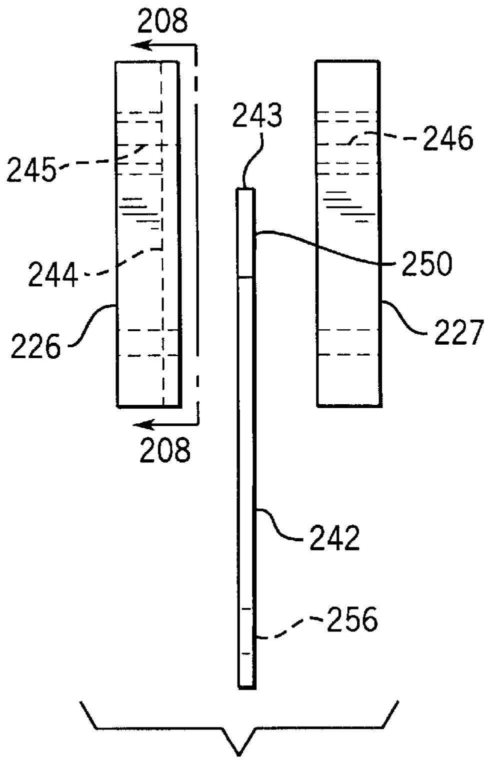
FIG. 30 is an exploded view of the cutter blade and its guide plates.

The rail sizing mechanism 214 in FIGS. 24 and 28–31 includes a rail cutter or sizer assembly, indicated generally at R, which extends both above and below table surfaces 212 and 213 as best seen in FIG. 28. The pleat sizing mechanism includes a pleat cutter or sizer assembly indicated generally at P.

The rail cutter assembly includes a pair of cutting blade holders 226, 227 which are secured to one another above the surface 212 by bolts 228, 229. The cutting blade holders form, in effect, an anvil as will appear hereinafter. The position of the holders 226, 227 are fixed with respect to the surface 212 by bolts 230, 231 which are fast with a pair of identical flanged struts, one of which is shown at 232, which struts are bolted to the flat base 211 by bolts 233, 234, 235 and 236.

A pair of side frame members 237, 238 are welded or otherwise suitably secured to the ends of the flanged struts and are preferably butted against the under surface 213 of the base 211. A pump base is indicate at 239, the pump base forming, with side frame members 237, 238, a pump cage or support box for a cutter blade powering mechanism indicated generally at 240.

The rail cutter assembly includes a cutter blade 242 having a sharpened point 243 which easily pierces a head or bottom rail which is locked into a cutting position in the blade holders. The blade 242 slides in a slideway 244 formed in cutter blade holder 226, the slideway being in effect a recess extending the length of cutter blade holder 226. Each of cutter blade holders 226, 227 has a slot therein, indicated generally at 245, 246 respectively, which slots conform to the shape of the head and bottom rails whose cross sectional configurations, in this instance, are identical for ease of use and cost. When the cutter blade holders 226, 227 are bolted to one another by bolts 228–231, the slots 245, 246 in each of holders 226, 227 are aligned with one another so that the rail to be sized may be slid through the rail cutter R to any extent desired, including projecting beyond the left edge of base 211 as viewed in FIG. 24. A protective shield is indicated generally at 248. The shield is fixed in position with respect to the cutter blade holders 226, 227 by the bolts 228, 229 which press the vertical section 249 of the protective shield against the right side of cutter blade holder 227 as best seen in FIG. 24. The protective shield is spaced above the top of blade holders 226, 227 a distance sufficient to permit the cutting tip 243 and the punching edge 250 of the cutter blade to completely sever the rail and elevate the punched material above the top edge of the cutter blades 226, 227 where a collection of such cut slugs may be removed from time to time as desired. The inclined skirt portion 251 of the protective shield 248 tends to deflect any severed slugs of material toward the top surface 212 and, also, acts as a hold down for the severed portion of the rail so as to maintain said severed portion in a position where it may be readily grasped by the operator and transported to a disposal location.

The mechanism for actuating the cutter blade 242 is illustrated best in FIG. 28. An air pump is indicated generally at 252, the pump having an internal piston, not shown, and a piston rod 253 which extends out of the top end of cylinder 254, and reciprocates vertically. The upper end of the piston rod is connected to cutter blade by bolt 255 which passes through hole 256, see FIGS. 29 and 30, in cutter blade 242.

Means for controlling the pumping action, which will be explained hereinafter, and for guiding the travel of the cutter blade includes a spring yoke 257, which is also connected to blade 242 by bolt 255, and a return stop bar 258 which preferably consists of two bars which form a sandwich with cutter blade 242 via stop bar bolts 259, 260. The stop bar 258 functions to ensure that the cutter blade is not retracted too far when the spring yoke 257 is actuated, and also forms a support base for the spring yoke which negates any tendency for the spring yoke to pivot around connecting bolt 255. A pair of springs are indicated at 261, 262. The upper end of spring 261 is connected to spring yoke 257 at 263, and the lower end of spring 261 is connected to an anchor 264 by hook 265. Similar connections are illustrated for spring 262.

The piston in cylinder 254 is actuated by pump handle 270 whose lower end is pivoted as at 271 to a rigid brace 272. Brace 272 is fixed with respect to the cage formed by side frame members 237, 238 and pump base 239 by bolt 273 or other suitable connecting means which maintain brace 272 fixed with respect to side frame 237. A crank arm 274 which is rigid with the handle 270 is pivotally connected, as at 275, to a connecting link 276 whose lower end, in turn, is connected at 277 to the upper end of rod 278. Rod 278 projects from the upper end of a compressor cylinder 279 and carries a one way compression piston at its lower end. The cylinder 279 is connected at its lower end by means, not shown, to the inlet of cylinder 254 so that when pressure is generated in cylinder 279 by pulling handle 270 in the clockwise direction indicated by the arrow, the pressure so generated is built up in cylinder 254 beneath the piston therein and consequently raises it against the resisting force of springs 261, 262. Means for bleeding off pressure in the system after a rail has been cut (or, indeed, at any time after pressure has been generated) is indicated by a shaft 280 which is actuated by finger knob 281 which passes through an opening 282 in base 211 and an aligned hole in collar 283 which is welded or otherwise suitably secured to side frame 237. The shaft has, in this instance, a bevel gear 284 which meshes with another bevel gear 285 which in turn opens and closes a vent which permits pressure in the system to be bled off or built up as desired.

The balance of the rail sizing mechanism comprises the rail width selector 225 which is a length measurement indicated on the top surface 212 of the base 211. The distance increments, here inches, on the length measurement are measured from the right edge of blade 242 as viewed in FIG. 30 and, as illustrated, are preferably located on each side of a guide and locator path 287 on which the cord lock end of a pleated, factory made shade is placed preparatory to sizing the rail.

The pleat sizing mechanism 215 includes pleat cutter blade 290 which includes a handle 291 and is pivoted as at 292 about a pin 293 retained in L-shaped brackets 294 and 295 which are fast with base 211. Cutter blade 290 moves between two guide plates 296, 297 which are spaced from one another at their upper ends by spacers 298, the spacers also functioning as a limit stop for the clockwise, upward swing of the cutter blade as viewed in FIG. 25.

A U-shaped pleat confiner is indicated at 300 to maintain the pleats in a neatly jogged condition preparatory to the pleat cutting action. Spacers 301, 302 are shown on each side of the narrow cutting channel 303, see FIG. 24, formed between guide plates 296, 297 to permit the blade 290 to cut through, and a little beyond, the bottom most pleat in a pile of jogged pleats.

A pleat hold down mechanism is indicated generally at 305, the mechanism including a thumb tab 306 which slides between vertical guide rails 307, 308 which in turn are connected to base 211, the thumb tab 306 being depressed by hand applied pressure against the bias of return spring 309. Spring 309 is anchored to a back plate 311 which is fast with the vertical guide rails 307, 308. A guide plate is indicated at 312 to assist in guiding the jogged end of a pleated shade into the cutting channel formed between vertical guide rails 307, 308.

A half scale length measurement rod is indicated at 314 which is utilized during the first cut of the shade cutter, and a full scale length measurement rod is indicated at 315 which is utilized during the second cut of the shade cutter, all as will be described more fully hereinafter. Each of the half and full scale length measurement devises may, if desired, merely be marks on the top surface 212 of base 211. However, it is preferred that the length measurement devices be flat plates spaced apart the distance of the front to back dimension of the rails so as to ensure, together with the pleat confiner 300, that the pleated portion of the pleated shade is precisely aligned prior to cutting, thereby assuring a clean, sharp edge which is located 90° from the longitudinal axis of the pleated section of the shade.

The use and operation of the invention is as follows:

Referring first to FIG. 32 a factory made pleated shade is shown in its condition as received at a retail outlet preparatory to sale. Once placed on sale it may be sold in its factory-made condition in which event no further sizing would be required. For purposes of illustration, however, it will be assumed that a factory made pleated shade having a width of 36" has been selected by a purchaser in a retail outlet, and brought to the pleated shade sizing station to be shortened to 30".

The pleated shade sizing station is a table or work space 210 indicated in FIG. 24. At the sizing station the operator will first shorten each rail individually and, thereafter shorten the pleated shade fabric in one operation as follows.

Figure 33:
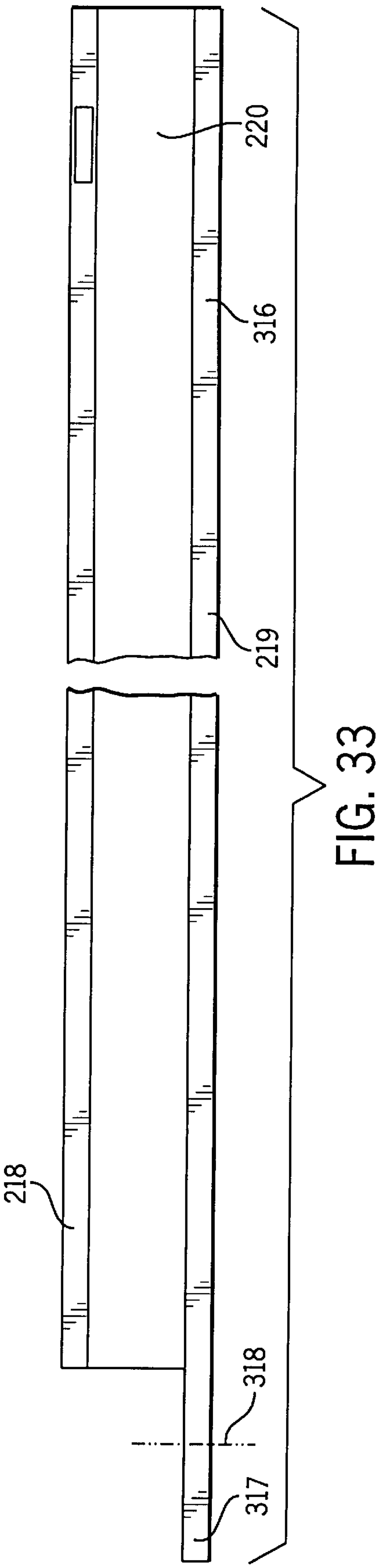
FIG. 33 is a side elevation similar to FIG. 9 with the bottom rail slid away from the pleated fabric preparatory to cutting along a reference plane.

After presentation of the shade in its factory made condition as illustrated in FIG. 32, the operator first slides the bottom rail 219 to the left as illustrated in FIG. 33. The top rail 218 and the fabric pleated shade material 220 remain in their position of FIG. 32 as taken from the box in which the shade was shipped from the factory.

Since the shade is to be shortened six inches, the shade is placed with its top rail 218 up on the top surface 212 of base 211 with the bottom rail 219 resting on the guide path 287 in the rail width selector 225. The right end 316 is aligned with the 30" mark on the rail width selector 225. The projecting left end portion 317 of bottom rail 219 is then inserted into the aligned slots 245, 246 in cutter blade holders 226, 227 with the excess portion extending outwardly to the left beneath skirt 251. When the right edge 316 of bottom rail 219 is aligned with the 30" mark on rail width selector 225, the plane in which the right side of cutter blade 242 travels will be exactly 30" from the right end 316 of bottom rail 219. The operator then rotates finger knob 281 in a direction to preclude venting of air pressure from the system. Thereafter the operator grasps handle 270 and pulls it toward the front of base 211 in the clockwise direction indicated by the arrow in FIG. 28. Movement of handle 270 about pivot 271 will depress rod 278 in compressor cylinder 279 via crank arm 274 and link 276, and, in turn, a pressure will be generated in main cylinder 254 which causes the piston therein to move piston rod 253 in an upward direction. Movement of piston rod 253 carries with it cutter blade 242 which is secured to piston 253 by connecting bolt 255. The tip 243 of the cutter blade 242 will first penetrate the center of the flat surface of the rail rigidly held in the anvil and proceed upwardly until the rail has been fully severed. The blade 242 pushes the now severed slug ahead of it until the top of anvil or cutter blade holders 226, 227 are cleared. Protective shield 248 will preclude any upward projection of the severed slug which could, of course, be dangerous to the operator.

After the rail has been severed, the severed portion will be restrained on the table top by inclined skirt 251 even if the severed section of the rail projects beyond the left end of base 211. The operator then rotates finger knob 281 in a direction to bleed pressure from the underside of the piston in cylinder 254, with the result that the springs 261, 262 acting through spring yoke 257 will retract cutter blade 242 downwardly to its FIG. 29 position in which the tip 243 is beneath the upper surface 212 of base 211. The bottom rail will thus have been shortened to a distance represented by the plane of the end 316 and the plane represented by cut line 318. The severed portion of rail 219 is then disposed of.

Figure 34:
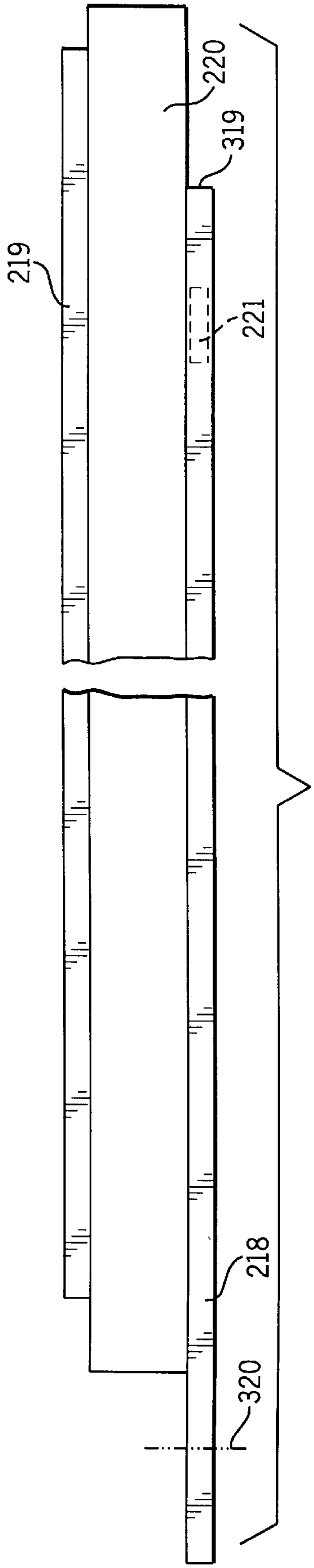
FIG. 34 is a view of the pleated shade following sizing of the bottom rail with the top rail slid away from the pleated fabric preparatory to cutting along a reference plane.

Following the bottom rail cutting operation, the operator slides the pleated shade to the right as viewed in FIG. 34 and reverses the position of the shade, top for bottom, with the top rail 218 now placed flat on the table. The right or cord lock end 319 is then aligned with the 30" mark on the rail width selector 225 and handle 270 again operated to cut top rail 218 along cutting plane 320. The severed portion of rail 218 is then disposed of.

At this point the top and bottom rails have been sized to the correct width, 30", and both rails have been severed from the end opposite the cord lock access.

Figure 35:
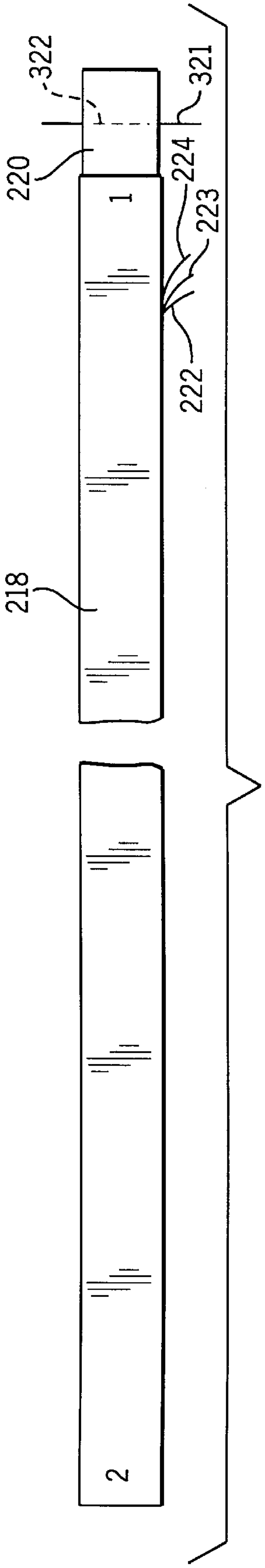
FIG. 35 is a top plan view of the pleated shade following shortening of the rails with the shortened rails slid away from the pleated fabric preparatory to cutting the right end of the pleated fabric.

At this point the operator moves the partially sized pleated shade to the shade width selector and places the sized bottom rail 219 between the half scale measurement rod 314 and the full scale measurement rod 315. The previously sized top and bottom rails 218, 219 are then slid to the left with respect to the right end of the pleated shade, and the exposed pleated shade inserted into the pleat confiner 300, with the assistance of guide plate 312 if required. The half scale measurement rod 314 is used to align the left end of the pleated shade. When the left end is placed on the "30" mark on the half scale, the cutter blade 290 is actuated by the operator pulling downward on handle 291 as illustrated in FIG. 24. This will sever the pleated shade along pleat cut line 321 to form cut pleat end 322 in FIG. 35. The severed portion of the pleated shade to the right of cut line 321 is then removed.

Figure 36:
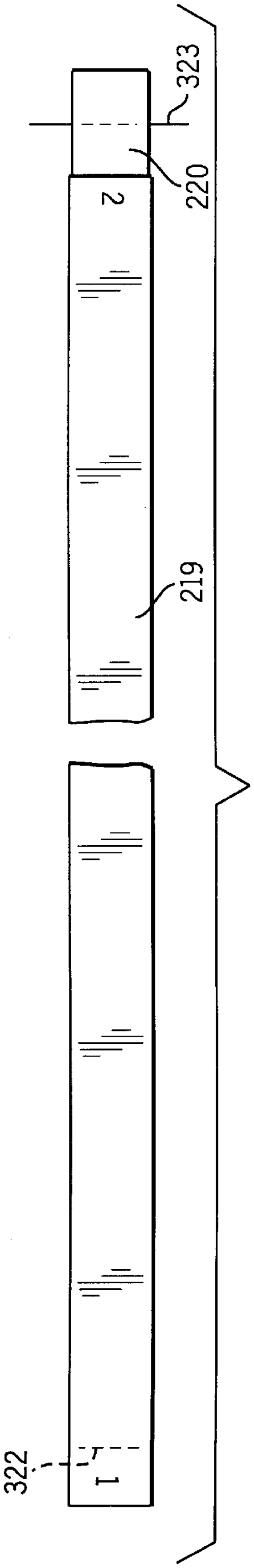
FIG. 36 is a bottom plan view of the pleated shade after the right end of the fabric has been cut and the shade rotated 180° from its FIG. 35 position with the shortened rails slid away from the compressed pleated fabric preparatory to cutting the left end of the pleated fabric as it appears in FIG. 32 to the final size.

Following cutting of the cord lock end of the pleated fabric, the pleated shade is rotated 180° to the position of FIG. 36. The top and bottom rails 218 and 219 are then slid to the left where each overlaps the pleated cut end 322, as best seen at the left end of FIG. 36. At this point the newly exposed end of the pleated shade is inserted in pleat confiner or guide 300 and a cut made along second pleat cut line 323. The full scale is used for this cut. The severed portion of the pleated shade to the right of cut line 323 is then removed.

At this point the rails and fabric are slid back to alignment and the ends of both of the rails and the pleated fabric will now be co-extensive since all portions of the pleated shade are of equal length. Thereafter, a cord latch assembly, not shown, is pushed into the cord latch access opening 221 with the individual cords projecting therethrough, end caps are inserted in the head rail, and the product is replaced in the original package and handed, by the service personnel in the retail outlet, to the purchaser/consumer.

It will be noted that it is only necessary for the retail service personnel to make three cuts after being given the dimension which the purchaser wishes. The first two cuts are made at the rail sizing station 214 using a single scale, and the last two cuts are made at the pleat sizing station 215 using first the top and then the bottom scale, operations which experience indicates are well within the skill level of the service personnel commonly found today in retail outlets which offer this type of merchandise. No calculations must be performed by the store personnel; such personnel are only required to align the ends of rails or the pleated shade with a length measurement numeral provided by the purchaser.

Although preferred and alternative embodiments of the invention have been illustrated and described, it will at once be apparent to those skilled in the art that modifications may be made within the spirit and scope of the invention. Accordingly, it is intended that the scope of the invention be limited solely by the scope of the hereafter appended claims when interpreted in light of the relevant prior art, and not solely by the scope of the foregoing specification.

We claim:

1. In a method of sizing a pleated shade to a desired size at the point of purchase in a retail outlet utilizing the level of skill of service personnel available in such retail outlets, said pleated shade having head rail means, bottom rail means, pleated fabric having a plurality of pleats formed therein, and means for retaining the upper and lower end portions of the pleated fabric in the head and bottom rail means, the method comprising:

moving the pleated fabric and said rail means laterally with respect to each other to thereby expose said rail means;

sizing said rail means while the pleated fabric remains retained with said rail means and laterally offset relative to said rail means, sizing said pleated fabric while said pleated fabric remains retained with said rail means and laterally offset relative to said rail means; and aligning the sized rail means and the sized pleated fabric following sizing.

2. The method of claim 1 further characterized in that the head and bottom rail means are sized separately.

3. The method of claim 2 further characterized in that the head and bottom rail means are each sized by removing a portion of the rail means material in a single sizing operation.

4. The method of claim 1 further characterized in that the pleated fabric is sized by removing excess pleated fabric material from each end portion of the pleated fabric.

5. The method of claim 4 further characterized in that substantially equal portions of excess pleated fabric material are removed from each end portion of the pleated fabric.

6. The method of claim 1 further characterized in that moving the pleated fabric and said rail means laterally with respect to each other includes moving a lift cord means having a distal end portion secured to the bottom rail means and a proximal end portion received in the head rail means and extending outwardly therefrom, such that the subsequent sizing operations occur while said head rail means, bottom rails means, pleated fabric, and lift cord means remain assembled as a unit.

7. A method for sizing a pleated shade to a desired width, said pleated shade including a head rail, a bottom rail, and a pleated fabric having a top portion and a bottom portion slidably attached to the head rail and bottom rail respectively, the pleated fabric, head rail and bottom rail each having a first end and a second end, the method comprising:

moving the pleated fabric laterally with respect to the head rail such that a portion of the head rail extends beyond the first end of the pleated fabric, and the second end of the pleated fabric extends beyond the second end of the head rail;

sizing the head rail while the pleated fabric remains slidably attached to the head rail and bottom rail and laterally offset from the head rail and bottom rail;

moving the pleated fabric laterally with respect to the bottom rail such that a portion of the bottom rail extends beyond the first end of the pleated fabric, and the second end of the pleated fabric extends beyond the second end of the bottom rail;

sizing the bottom rail while the pleated fabric remains slidably attached to the bottom rail and laterally offset from the bottom rail;

sizing the pleated fabric proximate the second end while the second end of the pleated fabric extends beyond the second ends of the head rail and bottom rail;

moving the pleated fabric laterally with respect to the head rail and bottom rail such that the first end of the pleated fabric extends beyond the head rail and bottom rail;

sizing the pleated fabric proximate the first end while the first end of the pleated fabric extends beyond the first ends of the head rail and bottom rail; and aligning the sized pleated fabric, head rail and bottom rail.

8. A method for sizing a pleated shade to a desired width, said pleated shade including a head rail and a pleated fabric having a top portion attached to the head rail, the method comprising:

moving the pleated fabric laterally with respect to the head rail;

sizing the head rail independently of the pleated fabric while the pleated fabric remains connected to the head rail and laterally offset from the head rail, sizing the pleated fabric while the pleated fabric remains connected to the head rail and laterally offset relative to the head rail.

9. The method of claim 8 wherein moving the pleated fabric laterally with respect to the head rail includes extending a first end of the pleated fabric beyond a first end of the head rail.

10. The method of claim 9 wherein sizing the head rail includes cutting a portion of the head rail opposite the first end of the head rail.

11. The method of claim 9 wherein sizing the pleated fabric includes cutting a portion of the pleated fabric proximate the first end, and cutting a portion of the pleated fabric proximate a second end, distal the first end of the fabric.

12. The method of claim 9 wherein sizing the pleated fabric includes cutting a portion of the pleated fabric proximate the first end, moving the pleated fabric laterally with respect to the head rail such that a second end of the pleated fabric distal the first end of the pleated fabric extends beyond a second end of the head rail, and cutting a portion of the pleated fabric proximate the second end.

13. The method of claim 8 further including moving the pleated fabric laterally with respect to a bottom rail to which the pleated fabric is connected, and sizing the bottom rail independently of the pleated fabric while the pleated fabric remains connected to the bottom rail and laterally offset from the bottom rail.

14. The method of claim 13 wherein moving the pleated fabric includes moving a lift cord having a distal end connected to the bottom rail and a proximal end thereof received in the head rail and extending outwardly therefrom, such that the subsequent sizing operations occur while said head rail means, bottom rails means, pleated fabric, and lift cored remain assembled as a unit.

* * * * *